Dec. 7, 1937.  J. MISTRETTA  2,101,035

SECURING MECHANISM FOR AUTOMOBILE DOORS

Filed July 24, 1936  2 Sheets-Sheet 1

John Mistretta, Inventor

By William C. Linton, Attorney

Dec. 7, 1937.  J. MISTRETTA  2,101,035
SECURING MECHANISM FOR AUTOMOBILE DOORS
Filed July 24, 1936  2 Sheets-Sheet 2
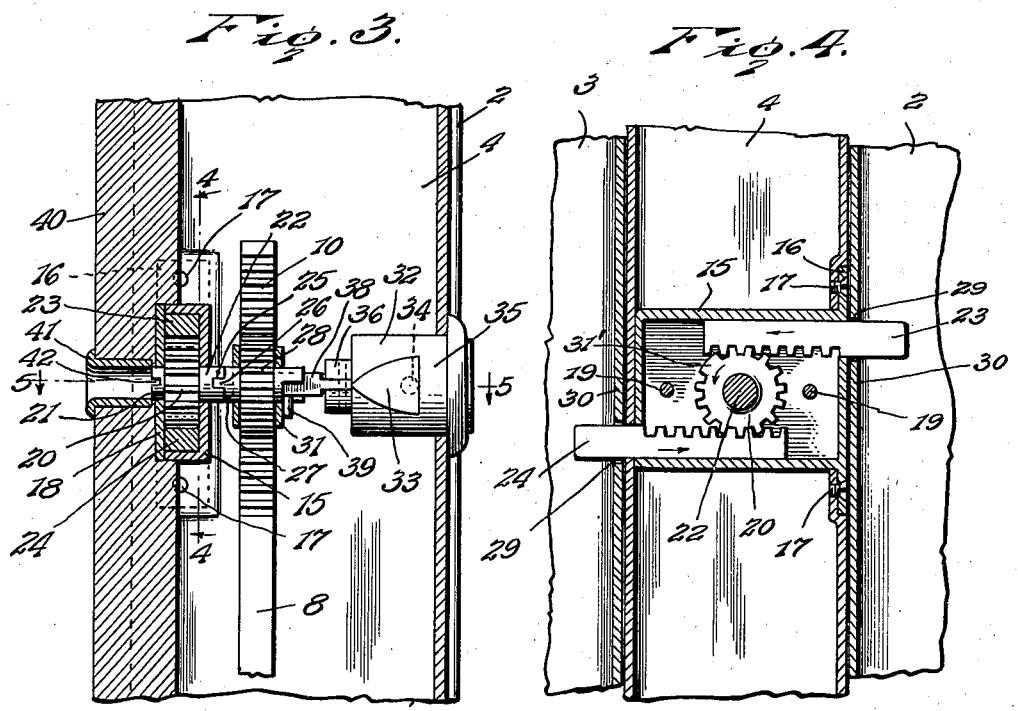
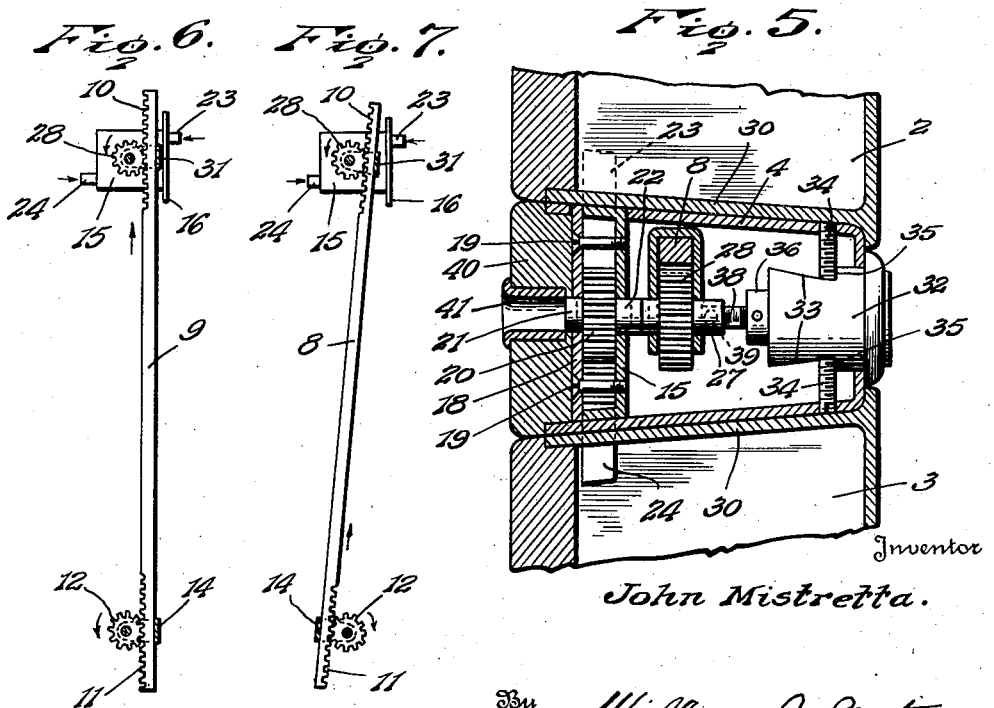
Inventor
John Mistretta.
By William C. Linton
Attorney Patented Dec. 7, 1937

2,101,035

UNITED STATES PATENT OFFICE 2,101,035

SECURING MECHANISM FOR AUTOMOBILE DOORS

John Mistretta, New York, N. Y.

Application July 24, 1936, Serial No. 92,401

3 Claims. (Cl. 70—264)

This invention relates to a door securing means and more particularly to a securing means for use in an automobile and by means of which the doors at opposite sides of the automobile may be simultaneously secured and firmly held closed until a lock forming part of the securing means is actuated to release the doors.

One object of the invention is to so construct the improved securing means that not only may doors at opposite sides of an automobile be simultaneously secured or released, but also cause the front and rear doors at each side of the automobile to be held closed when the securing means is locked.

It is another object of the invention to provide an improved door securing mechanism of such construction that it may be mounted in the door posts at opposite sides of the automobile with a portion extending under the floor boards, thus causing the securing mechanism to be entirely concealed from view except the outer end of a lock barrel which protrudes through the door post at one side of the automobile. Therefore, the securing mechanism will be hidden from view and will not detract from the appearance of the automobile.

Another object of the invention is to so construct the door securing mechanism that it may be installed in an automobile body of a conventional construction without altering the same and thus permit it to be installed at a small cost.

It is another object of the invention to provide a door securing mechanism which is simple in construction, very easy to operate and not liable to get out of order.

The invention is illustrated in the accompanying drawings wherein:

Fig. 3 is a view upon an enlarged scale of the upper end of the right hand portion of Figure 2.

Fig. 4 is a sectional view taken vertically along the line 4—4 of Figure 3.

Fig. 5 is a sectional view taken horizontally along the line 5—5 of Figure 3.

Fig. 6 is a sectional view taken along the line 6—6 of Figure 2, and

Fig. 7 is a sectional view taken along the line 7—7 of Figure 2.

Figure 1:
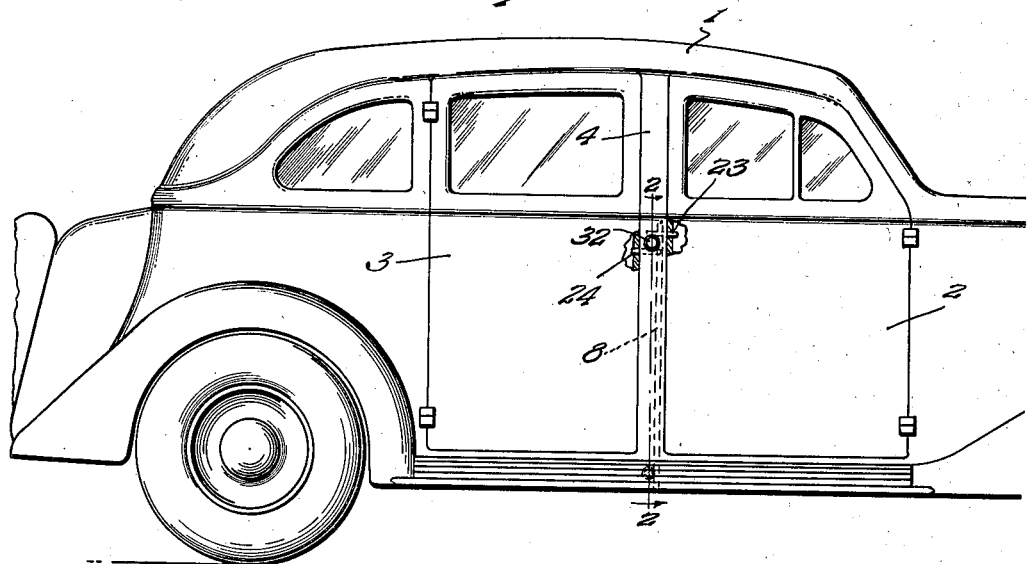
Fig. 1 is a view in elevation of an automobile having the improved door securing mechanism installed therein.

The automobile which is shown in side elevation in Figure 1 is of a conventional construction and has a body 1 and the usual front and rear doors 2 and 3 at opposite sides thereof, the usual hollow door post 4 being provided against which the doors fit when closed. The door posts are opposite each other and their lower ends rest upon the sills 5 where they are firmly secured. There has also been provided the usual flooring 6 and the chassis bars 7. It will thus be seen that the automobile is of a conventional construction and no special construction is necessary in order to permit the improved securing mechanism to be installed.

Figure 2:
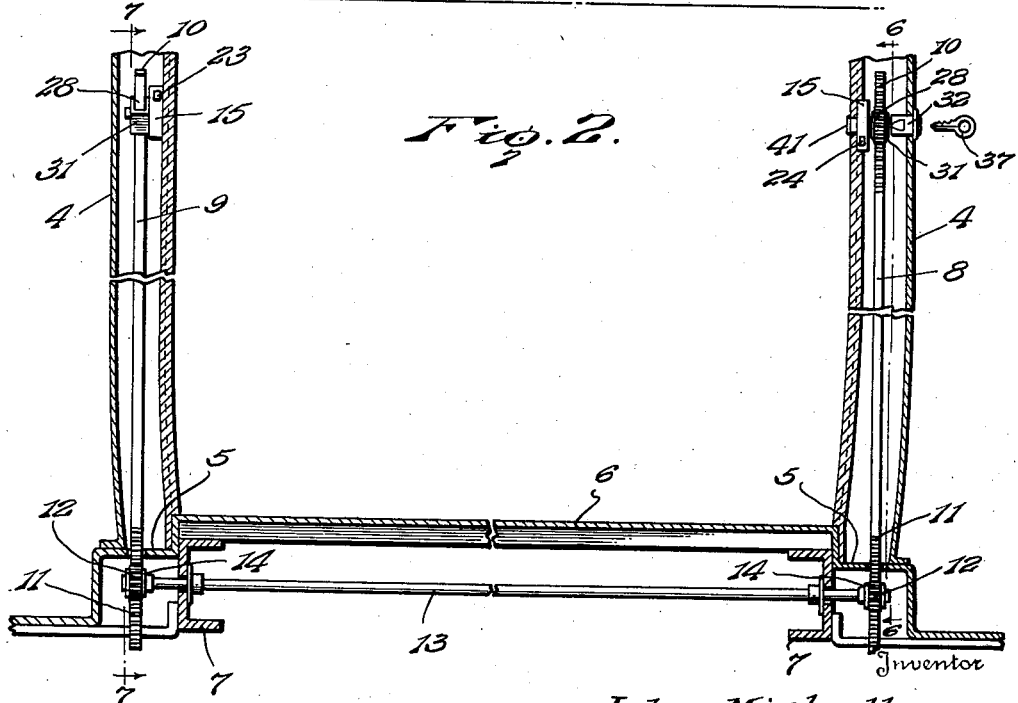
Fig. 2 is a sectional view taken transversely through the automobile along the line 2—2 of Figure 1.

This improved securing mechanism is installed as shown in Figures 1 and 2 and referring particularly to Figure 2, it will be seen that bars 8 and 9 having racks 10 and 11 at their upper and lower ends extend vertically in the door posts with the racks at their lower ends extending downwardly through openings in the sills 5 and meshing with gears 12 fixed to ends of a shaft 13 which extends transversely of the automobile body under the flooring with its end portions journaled through the chassis bars 7. Therefore, when the rack bar 8 is shifted vertically rotary motion will be transmitting to the shaft 13 and as the shaft is geared to the rack bar 9, this rack bar will also be shifted vertically in the same direction as the rack bar 8 and to the same extent. Yokes 14 which are carried by ends of the shaft 13 straddle the rack bars and hold the lower racks in meshing engagement with the gears 12 so that there is no danger of the racks shifting out of proper engagement with the gears.

A lock casing 15 is mounted in each of the door posts and upon referring to Figure 4, it will be seen that each casing extends transversely in the door post and at one end is formed with a flange 16 through which screws 17 are passed to securely hold the casing in place. The detachable side wall 18 of the casing is held in place by the screws 19 and therefore, the casing may be opened in order to permit access to the interior thereof. By so forming the casing, a gear or pinion 20 may be set into the casing with its stub shafts 21 and 22 rotatably engaged through openings formed in side walls of the casing and when the pinion is rotated, the bolts or plungers 23 and 24 which are formed with rack teeth meshing with the pinion, will be extended or retracted according to which direction the pinion is rotated. The outer end of the shaft 22 is formed with a groove 25 to receive the tongue 26 at one end of the shaft 27 of a gear or pinion 28 and it will be obvious that when the pinion 28 is rotated, rotary motion will be transmitted to the pinion 18 and sliding motion imparted to the bolts 23 and 24. The plungers pass through aligned openings formed in end walls of the casing and side walls of the hollow door post and when they are moved to an extended position, they pass through openings 29 formed in edge walls of the front and rear doors and securely hold the doors closed. At one point 31' about the circumference of the pinion, a tooth is filled in or omitted, thereby providing an abutment which by engaging the rack teeth of the plungers will limit rotation of the pinion and prevent it from moving out of mesh with the racks of the plungers. Therefore, there is no danger of the plungers becoming disengaged from the pinion and failing to move when the pinion is rotated. A yoke 31 holds the gear or pinion 28 in mesh with rack 10 at the upper end of the companion rack bar 8 or 9 and insures proper transmission of motion from one to the other.

In order to operate the securing mechanism, the outer face of the door post at one side of the automobile is formed with an opening through which is passed a key operated lock 32, the barrel of which has flattened side faces 33 for engagement by set screws 34 which are threaded through openings formed in side walls of the door post. The flat side faces slope towards the outer end of the barrel in converging relation to each other and form shoulders 35 which engage the set screws as shown in Figure 5 and referring to this figure, it will be seen that the set screws not only prevent rotation of the barrel but also prevent it from shifting longitudinally out of its proper position in the door post. The core 36 of the lock which is to be rotated when the key 37 is inserted into the lock and turned, projects from the inner end of the barrel and carries a link 38 which has one end pivoted to the core and its other end engaged with the confronting end of the shaft 27 of the pinion 28. Referring to Figures 3 and 5, it will be seen that the end portion of the shaft 27 engaged by the link 38 is hollowed to form a socket into which the end of the link extends and has a side portion formed with a passage or recess through which projects a pin 39 carried by the link and projecting laterally therefrom. By this arrangement, the lock can be inserted into the door post and the inner end of the link easily engaged in the socket of the shaft 27 and when the core of the lock is turned by the key to rotate the link, the pin, by making contact with the shaft at a side of the socket, will impart rotation to the shaft and the pinion thereof.

When this improved door securing mechanism is in use, it is installed as shown in Figures 1 and 2 and after the doors are closed, a key may be inserted into the lock and the core of the lock turned in a direction to rotate the shaft 27 to which the link 38 is attached and thus rotate the companion shaft 22 and pinion 20 in a direction to project the bolts 23 and 24 outward from the door post at this side of the automobile and into the doors at opposite sides thereof to secure the doors closed. During this time, the pinion 28 of the shaft 27 engaged by the link imparts longitudinal movement to the rack bar 8 and as this bar shifts vertically, rotary motion will be transmitted to the shaft 13 by the rack 11 at the lower end of the bar 8 and the pinion 14 meshing therewith. Rotation of the shaft 13 causes longitudinal movement to be imparted to the rack bar 9 and as this rack bar shifts vertically rotary motion will be transmitted to the pinion engaged by the rack 10 at the upper end of the bar 9 so that the bolts of the lock carried by the door post through which the rack bar 9 moves will be projected outwardly to extend into and secure the front and rear doors at opposite sides of this post. It will thus be seen that by a single operation, the front and rear doors at both sides of the automobile may be secured or released. Therefore, there will be no danger of forgetting to lock all doors of the automobile and in addition, a great deal of time and trouble will be saved. The inner wall 40 of the door post carrying the lock 32 is formed with an opening in which is fitted a sleeve or nipple 41 and the confronting end of the stub shaft 21 is formed with a notch or groove 42 in order that the shank of a turning key kept in the automobile may be passed through the sleeve and engaged in the groove to permit the doors to be released or secured from within the automobile. By this arrangement, the doors may be locked when small children are in the automobile and there will be no danger of them unintentionally releasing a door and thus allowing the door to swing open while the automobile is in motion with resulting likelihood of injury by a child falling out of the automobile. If so desired, a permanent turning handle may be mounted through the sleeve and thus allow releasing of the doors from within the automobile without use of a key. It will also be obvious that while the door securing mechanism has been shown installed in an automobile having front and rear doors, it may be installed in an automobile having only one door at each side.

Having thus described the invention, what is claimed is:

1. In a device for simultaneously locking all doors of a vehicle from a central point comprising a fastener for each pair of front and rear doors having a pair of rack plungers mounted therein, a pinion meshing with the racks of each pair of plungers whereby the latter may be moved in opposite directions, a pinion shaft for each pinion, a driven shaft mounted upon and extending transversely of the vehicle frame, gears keyed to the opposite ends of said driven shaft, rack bars each having racks at their lower ends for engaging said gears, and racks at their upper ends, means for operatively connecting the racks at the upper ends of said rack bars to said pinion shafts and means for rotating one of said pinion shafts from either side thereof.

2. In a device for simultaneously locking all doors of a vehicle from a central point comprising a fastener for each pair of front and rear doors having a pair of rack plungers mounted therein, a pinion meshing with the racks of each pair of plungers whereby the latter may be moved in opposite directions, a pinion shaft for each pinion, a driven shaft mounted upon and extending transversely of the vehicle frame, gears keyed to the opposite ends of said driven shaft, rack bars each having racks at their lower ends for engaging said gears, and racks at the upper ends on a face of said rack bars opposite to the racks of the lower end, means for operatively connecting the racks at the upper ends of said rack bars to said pinion shafts and means for rotating one of said pinion shafts from either side thereof.

3. In a device for simultaneously locking all doors of a vehicle from a central point comprising a fastener for each pair of front and rear doors having a pair of rack plungers mounted therein, a pinion meshing with the racks of each pair of plungers whereby the latter may be moved in opposite directions, a pinion shaft for each pinion, rack bars each having racks at their lower ends and racks at their upper ends, means for operatively connecting the racks at the upper ends of said rack bars to said pinion shafts, gears engaging the racks at the lower ends of said rack bars, means operatively connecting said gears and means for rotating one of said pinion shafts from either side thereof.

JOHN MISTRETTA.